United States Patent
Craft et al.

(10) Patent No.: US 6,275,884 B1
(45) Date of Patent: Aug. 14, 2001

(54) METHOD FOR INTERCONNECTING COMPONENTS WITHIN A DATA PROCESSING SYSTEM

(75) Inventors: David John Craft, Austin; Wendel Glenn Voigt, Pflugerville, both of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/276,383

(22) Filed: Mar. 25, 1999

(51) Int. Cl.[7] .............................. G06F 13/38; G06F 13/40
(52) U.S. Cl. .................. 710/126; 710/104; 710/129; 370/445; 370/462; 324/309; 324/312
(58) Field of Search ..................... 710/104, 129, 710/126; 324/309, 312; 370/445, 462

(56) References Cited

U.S. PATENT DOCUMENTS 4,538,263 * 8/1985 Gabrielli et al. ..................... 370/445
4,885,538 * 12/1989 Hoenniger, III et al. ............ 324/312
4,933,845 * 6/1990 Hayes .................................... 710/104
5,530,887 * 6/1996 Harper et al. ......................... 710/104

FOREIGN PATENT DOCUMENTS

0716361A2 * 6/1996 (EP) .

* cited by examiner

*Primary Examiner*—Rupal Dharia
(74) *Attorney, Agent, or Firm*—Casimer K. Salys; Bracewell & Patterson, L.L.P.

(57) ABSTRACT

A method for interconnecting components within a data processing system is disclosed. A number of components is connected to an uni-directional bus. The uni-directional bus is arranged in a loop configuration. Each component has at least one node identification. Communications among these components are provided in the form of messages via a respective node identification. Each message includes a node identification field and a content field.

10 Claims, 2 Drawing Sheets

METHOD FOR INTERCONNECTING COMPONENTS WITHIN A DATA PROCESSING SYSTEM

BACKGROUND OF THE INVENTION

1. Technical Field

The present invention relates to a method for data processing in general, and in particular to a method for interconnecting components within a data processing system. Still more particularly, the present invention relates to a method for interconnecting chips within a device and logical subcircuits within a chip.

2. Description of the Prior Art

Within a data processing system, various components, such as a processor, a system memory, etc., are typically interconnected with each other via a group of wires known as a bus. In fact, the technique of using a multi-drop bus to transmit data has been in common use since the early days of electronic computers. Two types of multi-drop buses are typically utilized in a data processing system, namely, a data bus and an address bus. As their names imply, the data bus is utilized to transmit data, and the address bus is utilized to transmit addresses. There are many advantages in using a single interconnecting scheme such as a multi-drop bus for interconnecting components within a data processing system. For example, new components can easily be added or even be ported between data processing systems that use a common multi-drop bus.

When interconnecting subcircuits within a chip, however, a multi-drop bussing scheme requires additional wiring to combine each individual source into the multi-drop bus for each destination. As a result, the wiring becomes more difficult with the increase in the width of the bus and the number of subcircuits. Without resorting to the prior art multi-drop bussing scheme, the present invention discloses an improved method for interconnecting components within a data processing system, chips within a device, and logical subcircuits within a chip.

SUMMARY OF THE INVENTION

In accordance with a preferred embodiment of the present invention, a number of components is connected to an uni-directional bus. The uni-directional bus is arranged in a loop configuration. Each component has at least one node identification. Communications among these components are provided in the form of messages via a respective node identification. Each message includes a node identification field and a content field.

All objects, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

A. A LOOP TOPOLOGY

In accordance with a preferred embodiment of the present invention, components within a data processing system are interconnected in a loop formation. The loop is preferably organized as a peer-to-peer loop. Each component on the loop is considered a node, and has at least one unique node identification (node ID). Information, which includes both data and addresses, is transmitted and routed around the loop as messages, in one direction only. Any one component on the loop can send messages to another component on the loop. A component can have more than one node ID, and each of the node IDs is utilized to identify different kinds of incoming messages from multiple source components. If the distance between two components becomes too long, repeater blocks may be used between nodes to amplify the signals. These repeater blocks do not require a node ID.

B. AN EXEMPLARY LOOP SYSTEM AND MESSAGE FORMATS

Figure 1:
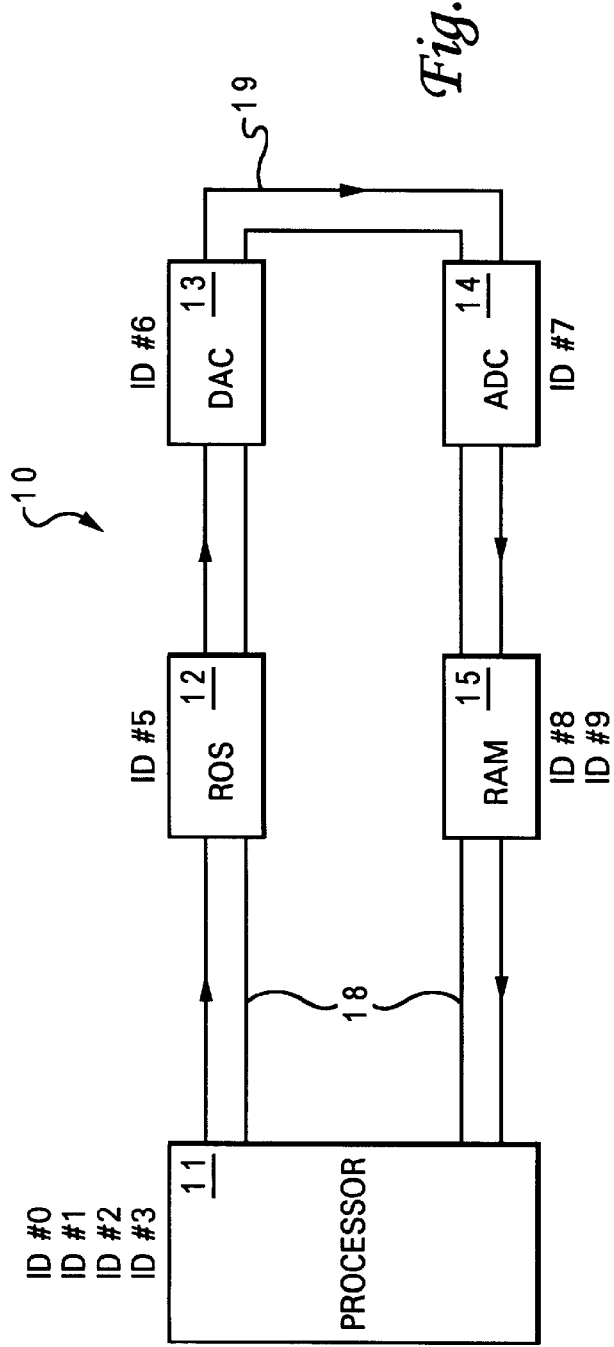
FIG. 1 is a block diagram of an exemplary loop system, in accordance with a preferred embodiment of the present invention.

Referring now to the drawings and in particular to FIG. 1, there is illustrated a block diagram of an exemplary loop system, in accordance with a preferred embodiment of the present invention. As shown, a loop system 10 includes a processor 11, a read-only storage (ROS) 12, a digital-to-analog convertor (DAC) 13, an analog-to-digital convertor (ADC) 14, and a random access memory (RAM) 15. Processor 11, ROS 12, DAC 13, ADC 14, and RAM 15 are interconnected by a loop 19. Loop 19 is a uni-directional bus. Some of the components within loop system 10 has a single node ID while other components have multiple node IDs. For example, each of ROS 12, DAC 13, and ADC 14 have a single node ID, while both processor 11 and RAM 15 have multiple node IDs. As mentioned previously, components within loop system 10 communicate with each other via messages. Thus, for those components that have multiple node IDs, each of the node IDs can be associated with a component within loop system 10 such that the source component of a message can be identified.

Figure 2:
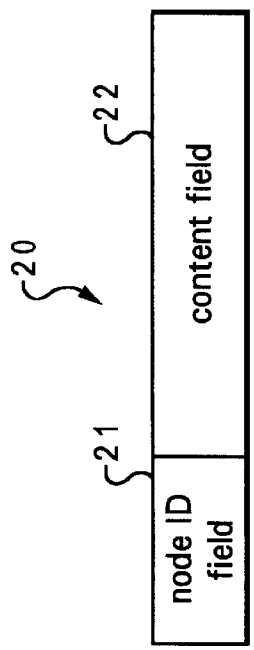
FIG. 2 is a block diagram of a message format in accordance with preferred embodiment of the present invention.

With reference now to FIG. 2, there is illustrated a block diagram of a message format in accordance with preferred embodiment of the present invention. As shown, a message 20 includes a node ID field 21 and a content field 22. Node ID field 21 contains a node ID of a receiving component within a loop. Content field 22 may contain data, an address, or an "action" for the receiving component to perform. The action may be a command, a control function or other operation as needed.

The following are some examples of messages that are applicable for loop system 10 of FIG. 1:

Example 1: processor 11 requesting data from ROS 12 at address location AA AA AA AA $\mu$P to ROS: 05 AA AA AA AA [data request, address AAAAAAAA]

Processor 11 generates a data request message "05 AA AA AA AA" to ROS 12. The data request message includes a node ID #5 (i.e., ROS 12) and a 32-bit address "AA AA AA AA." The data request message travels from processor 11 directly to ROS 12 having a node ID #5.

Example 2: ROS 12 sending data to processor 11 from address location AA AA AA AA ROS to $\mu$P: 01 D0 . . . DF [data response D thru DF]

After receiving the data request message "05 AA AA AA AA" from processor 11, ROS 12 generates a data response message "01 D0 . . . DF" back to processor 11. The data response message includes a node ID #1 of processor 11 and a data response DO thru DF. Node ID #1 signifies to processor 11 that the message is from ROS 12. The data response message travels from ROS 12 to node ID #1 of processor 11, passing through DAC 13, ADC 14, and RAM 15. DAC 13, ADC 14, and RAM 15, although forwarding the above data response message, will ignore the data response message, and other nodes are not involved.

Example 3: processor 11 output data OD DD to DAC 13

μP to DAC: 06 D DD [output data value ODDD to DAC]

Processor 11 generates an output data message "06 OD DD" to DAC 13. The output data message includes a node ID #6 (i.e., DAC 13) and data "OD DD." The output data message travels from processor 11 to node ID #6 of DAC 13, passing through ROS 12. ROS 12, while forwarding the above data output message, will ignore the above data output message, and other nodes are not involved.

Example 4: processor 11 sends a command CCCC to ADC 14 to sample/capture output

μP to ADC: 07 CC CC [Command CCCC to ADC to sample/capture input]

Processor 11 generates a command message "07 CC CC" to ADC 14. The command message includes a node ID #7 (i.e., ADC 14) and a command "CC CC." The command message travels from processor 11 to node ID #7 of ADC 14, passing through ROS 12 and DAC 13. ROS 12 and DAC 13, while forwarding the above command message, will ignore the command message, and other nodes are not involved.

Example 5: ADC 14 sends a sample input C to processor 11

ADC to μAP: 02 CD DD [ADC sample input C, input value CDDD]

After receiving the command message "07 CC CC" from processor 11, ADC 14 generates a sample input message "02 CD DD" back to processor 11. The sample input message includes a node ID #2 of processor 11 and an input value "CDDD." Node ID #2 signifies to processor 11 that the message is from ADC 14.

The sample input message travels from ADC 14 to node ID #2 of processor 11, passing through RAM 15. RAM 15, while forwarding the above command message, will ignore the command message, and other nodes are not involved.

Example 6: processor 11 requesting data from RAM 15 at address AA AA AA AA

μP to RAM: 08 AA AA AA AA [read request from AAAAAAAA]

Processor 11 generates a read request message "08 AA AA AA AA" to RAM 15. The read request message includes a node ID #8 (i.e., read request to RAM 15) and a 32-bit address "AA AA AA AA." The read request travels from processor 11 to node ID #8 of RAM 15, passing through ROS 12, DAC 13, and ADC 14.

ROS 12, DAC 13, ADC 14, node ID #9 of RAM 15 will ignore the above read request message. RAM 15 then sends the requested data back to processor 11.

Example 7: RAM 15 sending data DO thru DF to processor 11 RAM to μP: 03 D0 . . . DF [data DO thru DF to processor]

After receiving the read request message "08 AA AA AA AA" from processor 11, RAM 15 generates a data response message "03 D0 . . . DF." The data response message includes a node ID #3 of processor 11 and a data response "D0 . . . DF." The data response message travels from RAM 15 directly to node ID #3 of processor 11 and other nodes are not involved.

Example 8: processor 11 writing data to RAM 15 at address AA AA AA AA

μP to RAM: 09 AA AA AA AA D0 . . . DF [write request to AAAAAAAA ]Processor 11 generates a write request message "09 AA AA AA AA D0 . . . DF" to RAM 15. The write request message includes a node ID #9 (i.e., write request to RAM 15), a 32-bit address AA AA AA AA, and data "D0 . . . DF." The write request travels from processor 11 to node ID #9 of RAM 15, passing through ROS 12 DAC 13, and ADC 14. ROS 12 DAC 13, ADC 14, node ID #8 of RAM 15 will ignore the above write request message.

In addition, a component may have a node ID reserved for a broadcasting function to all other components. For example, node ID #0 of processor 11 can be set up for broadcasting messages simultaneously to ROS 12, DAC 13, ADC 14, and RAM 15.

As mentioned previously, loop 19 is a uni-directional, point-to-point data path. For synchronous implementation, all components on loop 19 are provided with a common clock via a control line 18. For asynchronous implementation, an interlocking scheme can be used via control line 18. With an interlocking scheme, a message cannot be launched from one component to a subsequent component until an interlocking signal is received back from the subsequent component. For both synchronous and asynchronous implementations, each segment within a loop can transmit messages independent of each other, as long as there is no overlapping of the transmission paths. For example, processor 11 can transmit messages to ROS 12 while DAC 13 is transmitting messages to ADC 14 or RAM 15. However, DAC 13 cannot transmit messages to ADC 14 or RAM 15 during the transmission of messages from processor 11 to ADC 14 because there is an overlapping of the transmission paths.

C. A SPLIT-LOOP TOPOLOGY

Figure 3:
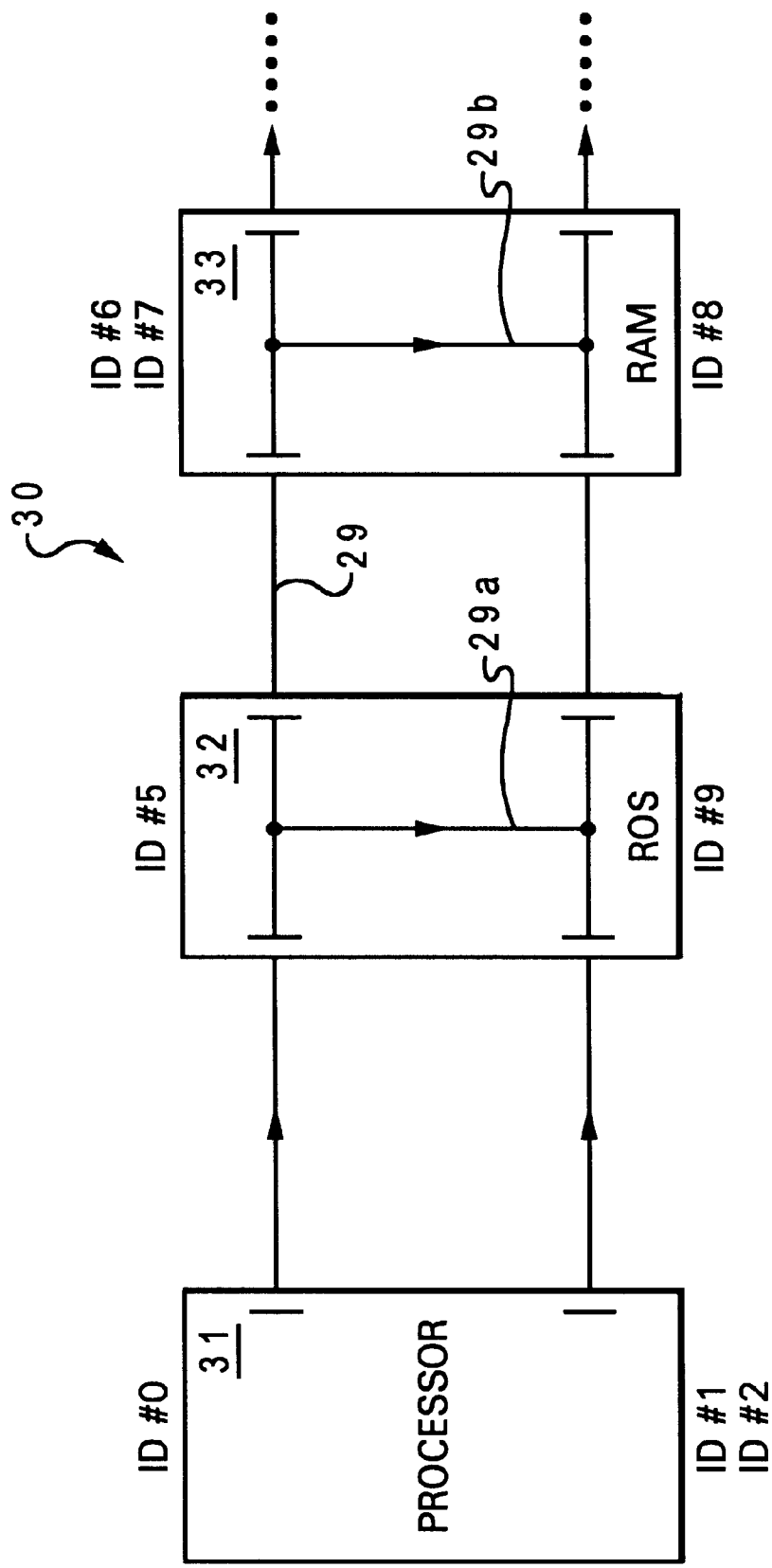
FIG. 3 is a block diagram of a loop system, in accordance with an alternative embodiment of the present invention.

Referring now to FIG. 3, there is illustrated a block diagram of a loop system, in accordance with an alternative embodiment of the present invention. As shown, components within loop system 30 are interconnected via a "split-loop" topology. Only three components are shown in loop system 30, namely, a processor 31, a ROS 32, and a RAM 33, though more components can be added after RAM 33.

Processor 31, a ROS 32, and a RAM 33 are interconnected to each other via a loop 29. Similar to loop 19 in FIG. 1, loop 29 is also an uni-directional bus, having branch loops, such as branch loops 29a and 29b. These branch loops are specifically designed for meeting high data throughput requirements, as will be explained later.

In addition to processor 31, both ROS 32 and RAM 33 also have multiple node IDs. For example, node ID #5 of ROS 32 is assigned for receiving inbound address messages and node ID #9 of ROS 32 is assigned for sending outbound data messages; node ID #6 of RAM 33 is assigned for receiving inbound address messages, node ID #7 of RAM 33 is assigned for receiving inbound data messages, and node ID #8 of RAM 33 is assigned for sending outbound data messages. Thus, if processor 31 requests data from node #ID 5 of ROS 32, the requested data can be sent to processor 31 via branch loop 29a instead of travelling around the entire loop. Similarly, if processor 31 requests data from node #ID 6 of RAM 33, the requested data can be sent to processor 31 via branch loop 29b instead of travelling around the entire loop. As such, the data throughput is enhanced, as compared to the loop configuration of FIG. 1.

As has been described, the present invention provides an improved method for interconnecting components within a data processing system. The present invention is applicable for interconnecting components within a data processing system and for interconnecting chips within a device. With discrete components, there are two disadvantages associated with the present invention. First, the failure or powered down of a single component can impact all other components on the loop. Second, it is more difficult to add or remove components during the operation of the system. However, none of the above-mentioned disadvantages are relevant to interconnecting chips within a single device for which the present invention is specifically well-suited. All chips connected to a loop within a device can reasonably be assumed to always work and always be powered if the device itself has power.

Furthermore, the present invention can be utilized to interconnect sub-circuits of a single integrated circuit such that the number of wires can be reduced. The prior art multi-drop bus requires an address source, an address destination, a data source, and a data destination. The present invention requires a single source and a single destination in the loop topology and only those devices that require the split loop topology will have two sources and two destinations per device. Because all communications are point-to-point in the present invention, thus the present invention also has the advantage of not requiring the source to be broadcast to all destinations.

While the invention has been particularly shown and described with reference to a preferred embodiment, it will be understood by those skilled in the art that various changes in form and detail may be made therein without departing from the spirit and scope of the invention.

What is claimed is:

1. A method for interconnecting components within a data processing system, said method comprising the steps of:

connecting a plurality of components on a uni-directional bus, wherein each of said components has at least one node identification; providing communications among said plurality of components via messages to a respective node identification; and transmitting a first message from a first node to a second node concurrent with transmitting a second message from a third node to a fourth node.

2. The method according to claim 1, wherein said uni-directional bus is arranged in a loop configuration.

3. The method according to claim 1, wherein said method further includes a step of providing said plurality of components with a common clock.

4. The method according to claim 1, wherein each of said messages includes a node identification field and a content field.

5. The method according to claim 1, wherein said method further includes a step of providing a branch loop within each of said plurality of components.

6. A data processing system, comprising:

a plurality of components connected on a uni-directional bus, wherein each of said components has at least one node identification;

means for providing communications among said plurality of components via messages to a respective node identification; and means for transmitting a first message from a first node to a second node concurrent with transmitting a second message from a third node to a fourth node.

7. The data processing system according to claim 6, wherein said uni-directional bus is arranged in a loop configuration.

8. The data processing system according to claim 6, wherein said plurality of components share a common clock.

9. The data processing system according to claim 6, wherein each of said messages includes a node identification field and a content field.

10. The data processing system according to claim 6, wherein each of said plurality of components further includes a branch loop.

\* \* \* \* \*